United States Patent [19]

Aihara et al.

[11] Patent Number: 4,783,676
[45] Date of Patent: Nov. 8, 1988

[54] LENS DRIVE DEVICE FOR A CAMERA

[75] Inventors: Yoshihiko Aihara, Yokohama; Nobuhiko Shinoda, Tokyo; Etsuro Furutsu, Kawasaki; Kazuhiro Izukawa, Yokohama, all of Japan

[73] Assignee: Canon Kabushiki Kaisha, Tokyo, Japan

[21] Appl. No.: 33,080

[22] Filed: Mar. 31, 1987

[30] Foreign Application Priority Data

Apr. 3, 1986 [JP] Japan .................................. 61-77075
Jan. 19, 1987 [JP] Japan .................................. 62-9443

[51] Int. Cl.$^4$ ............................................. G03B 3/00
[52] U.S. Cl. .................................... 354/400; 354/405; 354/195.13
[58] Field of Search ............ 354/400, 402, 405, 195.1, 354/195.13

[56] References Cited

U.S. PATENT DOCUMENTS

4,156,563  5/1979  Kato et al. ........................... 354/405
4,508,443  4/1985  Matsuzaki et al. .............. 354/195.13
4,639,588  1/1987  Shinoda ............................... 354/403

Primary Examiner—Russell E. Adams
Attorney, Agent, or Firm—Fitzpatrick, Cella, Harper & Scinto

[57] ABSTRACT

A lens drive device for a camera drives a lens by a motor to a position preset by an operator. The lens position is stored in a memory. When the lens is to be moved to the stored position while the lens is moved by an auto-focus device to an in-focus position, the lens is instantly moved by the motor to the stored position based on the data stored in the memory.

13 Claims, 7 Drawing Sheets

LENS DRIVE DEVICE FOR A CAMERA

BACKGROUND OF THE INVENTION

1. Field of the Invention

The present invention relates to a lens drive device for a camera, and more particularly to a lens drive control device for a camera having an auto-focus function.

2. Related Background Art

A camera which drives an auto-focusing lens to an in-focus position with to an object has been known.

In such a camera having the auto-focus function, an in-focus state with respect to a target object is always maintained. However, the autop-focus device drives the lens after it has calculated the drive distance of the lens to reach the in-focus position. Accordingly, if the camera is directed from an object A; for which the lens is now in-focus, to an object B spaced from the object A, a certain time is required before the in-focus state for the object B is attained.

For example, during photographing of a baseball match having players such as a first base player, a pitcher and a field player, it may be required to photograph a runner who suddenly runs from a third base to home base. In such a case, a chance to photograph the runner may be lost because it is difficult to instantly attain the in-focus state with respect to the home base.

Japanese Patent Publication No. 40322/1981 discloses an approach to the above problem. In this method, a mechanical stop is provided on a lens barrel, and a distance ring of an imaging lens is matched to the home base to attain the in-focus state with respect to the home base; the distance ring is mechanically semi-fixed. Even if the distance ring is then moved, it can be manually returned to the semi-fixed position where it is mechanically stopped. In this method, however, it takes time to mechanically semi-fix the distance ring. Further, when this method is applied to an auto-focus camera, the response time is not significantly improved.

More specifically, if the lens is to be driven to the semi-fixed position while the lens is tracking the object in the auto-focus mode, the lens cannot be manually driven in the auto-focus mode. Thus, the mode must be first switched from the auto-focus mode to the manual mode, and then the lens barrel must be manually driven to the semi-fixed position. Since the switching from the auto-focus mode to the manual mode is required, the improvement of the response time is not attained.

SUMMARY OF THE INVENTION

It is an object of the present invention to provide a lens drive device for a camera having an auto-focus function in which a desired lens barrel position is electrically stored and the lens is driven by a motor to the stored position by manipulating a member.

In order to achieve the above objective, in accordance with one aspect of the present invention, the lens drive speed is different between the auto-focus mode and the return to the stored position, that is, the lens drive speed in the return operation to the stored position is higher than the lens drive speed in the auto-focus mode so that the lens is returned to the stored position at the high speed without being restricted by a limit lens drive speed in the auto-focus mode. In the auto-focus mode, the lens cannot be driven very rapidly in view of response characteristics and the limit is set to the drive speed. On the other hand, in the return operation to the stored position, the lens can be driven independently from the auto-focus mode. Thus, the lens can be driven at the high speed without regard to the response characteristic. Accordingly, the lens drive speed is changed between the auto-focus mode and the return operation to allow high speed return to the stored position.

Other objects of the present invention will be apparent from the following description of the preferred embodiments.

DETAILED DESCRIPTION OF THE PREFERRED EMBODIMENTS

Figure 1:
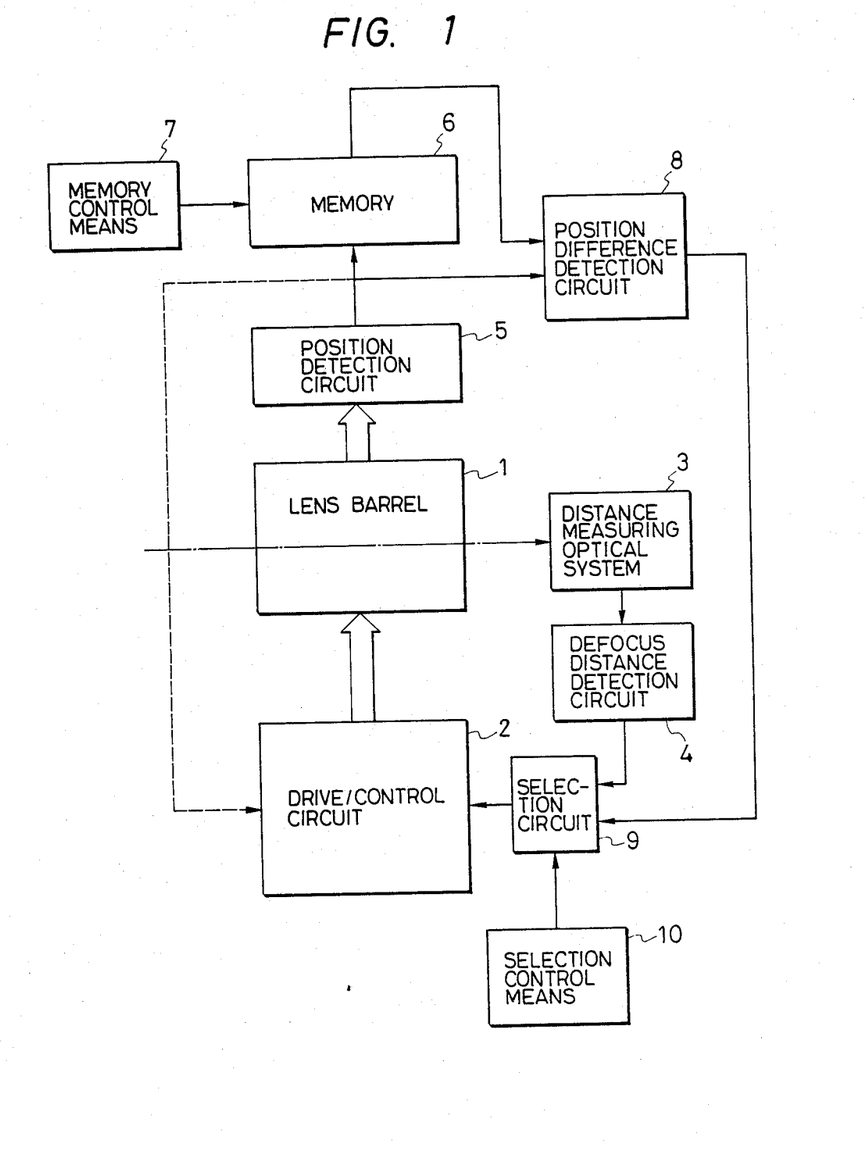
FIG. 1 shows a block diagram of one embodiment of a camera having a lens drive device in accordance with the present invention.

FIG. 1 shows a block diagram of a one-lens reflex camera in accordance with one embodiment of the present invention. Numeral 1 denotes a focusing optical system and a lens barrel for supporting it, numeral 2 denotes a drive/control circuit having a drive member for driving in and out the lens barrel for focusing the lens and a control circuit therefor, numeral 3 denotes a distance measuring optical system for directing an object image light from the focusing optical system to a photo-sensor, and numeral 4 denotes a defocus distance detetion circuit for detecting the distance between a current lens barrel position and a true in-focus position (defocus distance) based on a sensor output which depends on the image sensed by the photo-sensor through the optical system 3. Those elements constitute an auto-focus system. It may be constructed by one of various known systems. Numeral 5 denotes a position detection circuit for detecting the position of the lens barrel. It may comprise an encoded plate or resistor which is moved with the lens barrel to generate a signal representing the position of the lens barrel. Numeral 6 denotes a memory for storing the output of the position detection circuit and numeral 7 denote memory control means for storing the output of the position detection circuit in the memory. Those circuits constitute a lens barrel position storage system. Numeral 8 denotes a difference detection circuit for detecting a difference between the position detection circuit 5 and the memory 6.

Numeral 9 denotes a selection circuit which selects the output of the difference detection circuit 8 or the output of the defocus distance detection circuit 4, and numeral 10 denotes selection control means for controlling the selection of the selector 9.

The memory control means 7 may be a push-button type memory switch, and the selected control means 10 may be a push-button type home position switch which selects the output of the difference detection means 8 when it is depressed.

The operation of the device is described below. When a focusing start button, not shown (responsive to a first manipulation such as first stroke of a shutter release button in a conventional one-lens reflex camera) is depressed, an image of an object transmitted through the imaging lens is focused onto a sensor array such as a CCD through the distance measuring optical system 3, and a defocus distance to the in-focus position is calculated by the defocus distance detection circuit 4 based on the array output. The lens barrel drive control circuit 2 drives the lens by the defocus distance to the in-focus position. The output of the lens barrel position detection circuit may be fed back to the drive control circuit 2 to control the lens barrel position. In the present embodiment, the signal from the focus detection optical system is open-loop controlled to attain the in-focus position. By operating the memory control means (memory switch) 7, the lens barrel position information is stored in the memory 6. Since the memory has no connection with the auto-focusing operation, the lens barrel position may be a manually driven position to a position which is not related to the in-focus position (for example, an infinite position or overfocal distance).

After the lens barrel has been automatically or manually driven to various framing points, the selection control means (home position switch) is activated so that the lens drive control circuit 2 drives the lens barrel such that a difference between the stored lens position and the current lens position becomes zero.

Figure 2:
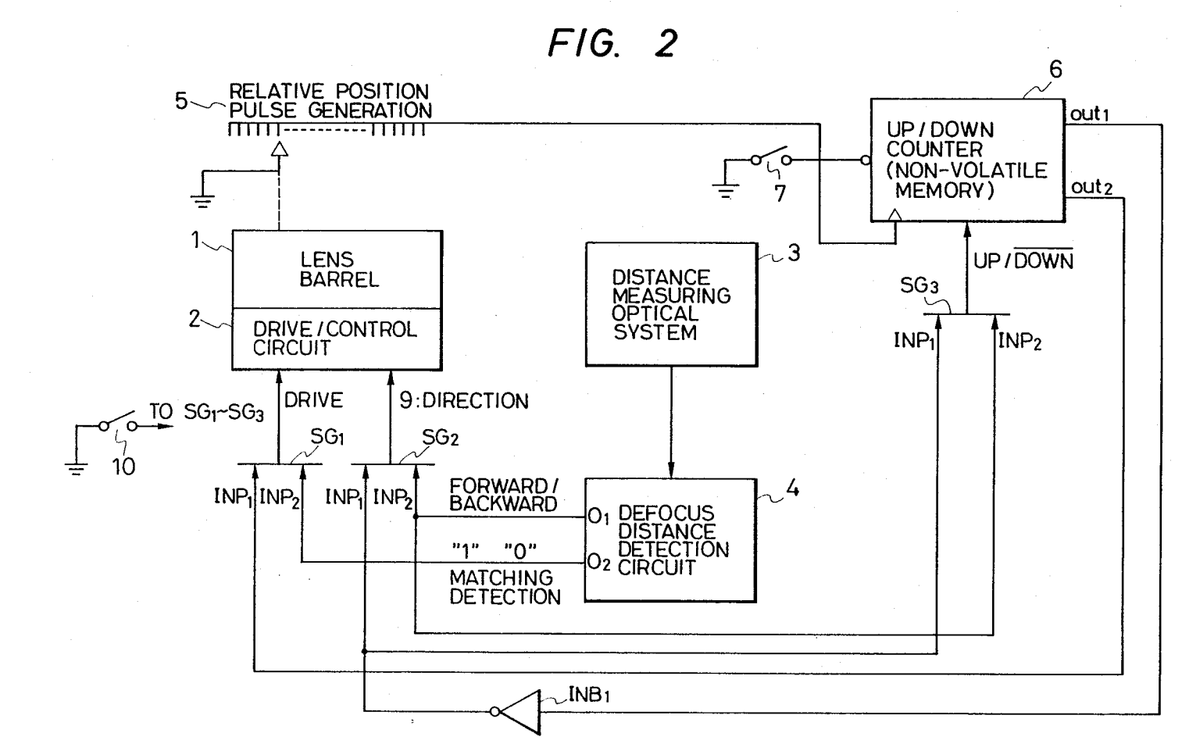
FIG. 2 shows a block diagram of another embodiment.

FIG. 2 shows a block diagram of a single-lens reflex camera in accordance with other embodiment of the present invention. Elements similar to those shown in FIG. 1 are designated by the same numerals. The defocus distance detection circuit 4 in FIG. 2 is designed to produce a lens drive direction (forward/backward) signal and an in-focus/defocus signal in accordance with the sensor output. SG1, SG2 and SG3 denote select gates which select an input $INP_1$ by a signal (ON signal) from a switch of the select control means 10 and sends the input signal $INP_1$ to the drive control circuit 2 and the counter 6. The position detection means 5 includes a slide contact which slides on a comb contact in linked relation to the comb contact and the lens barrel 1 and pulse generation means for generating pulses equal in number to the number corresponding to the drive distance of the lens barrel. The memory means 6 includes an up/down counter which is reset by the turn-on of the switch 7 as the memory control means counts up the pulses from the pulse generation means when the defocus distance detection circuit 4 produces the foward signal "1" and counts down the pulses when the circuit 4 produces the backward signal "0".

After the counter 6 has been reset by the turning-on or closing of the switch 7, the lens barrel is advanced, and when the counter 6 has an up-count compared to the reset count, the code bit is positive or "1", and when the lens barrel is retracted and the counter 6 has a down-count compared to the reset count, the code bit is negative or "0".

The operation of FIG. 2 is now explained. If the switch 7 is closed for a short period when the lens barrel is at a desired position and in-focus with respect to an object A, the counter 6 is reset. The lens barrel is then directed to an object B and a camera release button is depressed to activate the focus adjust device. Thus, the defocus distanct detection circuit 4 produces a signal to drive the lens to the in-focus position with respect to the object B. It is assumed that the lens is driven to the in-focus position with respect to the object B by advancing the lens barrel from the in-focus position to the object A. A forward signal "1" is produced from an output $O_1$ of the detection circuit 4, and a defocus signal "1" is produced from an output $O_2$, and those signals are supplied to the drive control circuit 2 through gates $SG_1$ and $SG_2$. Thus, the control circuit 2 is activated in response to the signal "1" supplied through the gate $SG_1$ and the lens barrel is driven forward in responce to the signal "1" supplied through the gate $SG_2$. During the forward movement, if the in-focus state with respect to the object B is attained, the output $O_2$ of the circuit 4 produces the in-focus signal "0" so that the drive control circuit 2 is deactivated in response to the "0" signal supplied through the gate $SG_1$ and the lens barrel is stopped. During the forward movement of the lens barrel, the counter 6 counts up the pulses supplied from the pulse generation circuit 5 and the count thereof indicates a drive distance for the lens to be driven to attain the in-focus state for the object B. Under this condition, the switch of the selection control means 10 is closed or turned on to select the input $INP_1$ of the gates $SG_1$, $SG_2$ and $SG_3$. As described above, the counter is in the count-up mode for the reset value and the counter 6 produces the output "0" at the output $OUT_2$ at the reset state. Accordingly, "" is sent from the output $OUT_2$ of the counter 6 and it is supplied to the drive control circuit through the gate $SG_1$ so that the drive control circuit is activated. The output $OUT_1$ of the counter 6 produces a signal "1" indicating the count-up and it is supplied to the drive control circuit 2 through the inverter $INB_1$ and the gate $SG_2$. Thus, the lens barrel is retracted. Since the output of the inventer $INB_1$ is supplied to the counter 6 through the gate $SG_3$, the counter 6 counts down the pulses supplied from the circuit 5 as the lens barrel is retracted, and when the count thereof reaches zero or reset value, the output $OUT_2$ produces "0" so that the drive control circuit is deactivated and the lens barrel is stopped. Accordingly, when the switch 10 is closed or is turned on, the lens barrel returns to the postion at which it was when the memory switch 7 was turned on.

Figure 3:
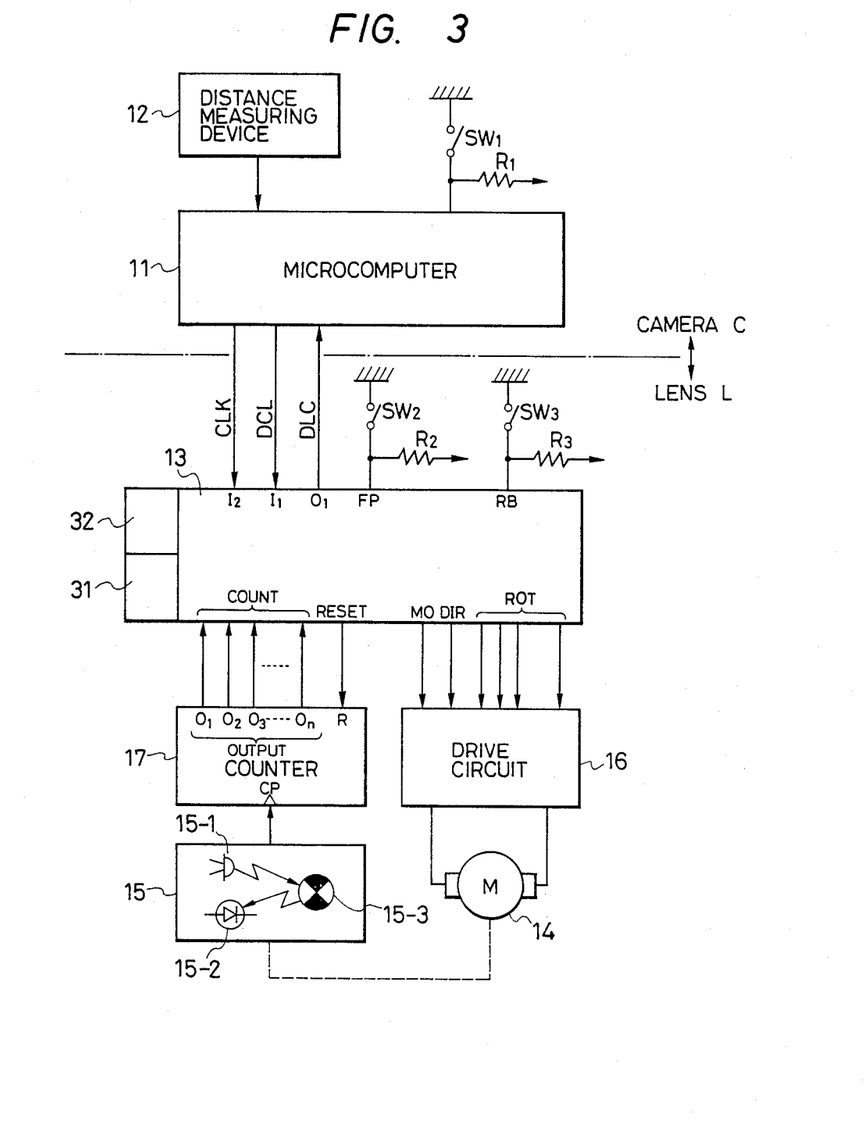
FIG. 3 shows a block diagram of a further embodiment.

FIG. 3 shows a block diagram of a single-lens reflex camera in accordance with another embodiment of the present invention. Numeral 11 denores a microcomputer on the camera.

A switch $SW_1$ having one terminal thereof grounded is a focus detection switch (power switch) which is closed or turned on by the depression in a first stroke of a release button, and $R_1$ denotes a pull-up resistor. When the switch $SW_1$ is closed, the microcomputer 11 on the camera is activated and an object image supplied through the imaging lens is directed to the sensor as two images, and the distance measuring device 12 detects the in-focus state for the object based on a deviation between the two images. The microcomputer 11 on the camera corrects the data representing the distance to the object and calculates, as the number of pulses, the defocus distance (a distance between a focusing plane of the object by the imaging lens, not shown, and a film plane, not shown), and a drive distance of the imaging lens corresponding to the defocus distance, that is, a rotation angle of the motor 4 linked to a lens distance setting member (not shown). This number of pulses is sent to a microcomputer on the lens through a communication line DCL and stored in a counter memory 31. Numeral 15 denotes an encoder of a kown photo-coupler which comprises a light source 15-1, a reflection plate 15-3 having reflection areas arranged at a predetermined interval and rotated by a motor 14, and a photo-sensor 15-2 for sensing the light reflected by the relfection plate 15-3. It is directly connected to the motor 14 and generates pulses as the motor 4 rotates. Numeral 16 denotes a drive circuit for the motor 4, and numeral 17 denotes a counter having a reset terminal R, a clock terminal CP, and output terminals $\theta_1 \sim \theta_n$. It counts the pulses generated by the encoder 15.

A terminal $I_1$ of the microcomputer 13 on the lens is a data input terminal to receive data from the microcompuer 11 on the camera through the communication line DCL, a terminal $I_2$ is a clock input terminal to receive the clock pulse from the microcomputer 11 on the camera through a communication line CLK, and a terminal $O_1$ is a data output terminal to send data from the microcomputer 13 on the lens to the microcomputer on the camera through the communication line DLC. An MO terminal is a motor start/stop terminal which activates a motor drive circuit 6 when it is at a high level (H level) and deactivates it when it is at a low level (L level), and a DIR terminal denotes a motor rotation direction control terminal which produces a clockwise (CL) signal when it is at a H level and a counterclockwise (CCL) signal when it is at a L level. An ROT terminal designates the rotation speed of the motor 14 in accordance with a rotation angle of the motor 14. A COUNT terminal receives the number of pulses of the counter 17 which counts pulses generated by the encoder 15 as the motor 14 rotates. In a normal AF mode, when the number of pulses from the encoder 15 supplied from the COUNT terminal matches the data of the counter memory 31 of the microcomputer 13 on the lens, the MQ terminal assumes the L level to stop the motor 14. A RESET terminal resets the content of the counter 17. It is used to reset the content of the counter 17 when the power supply is turned on. When the motor is stopped, the distance is measured by the distance measurement device 2 on the camera, and if it is in the in-focus state, the motor 4 is not restarted. If it is in the defocus state, the motor is repeatedly driven.

An FP terminal is a focus-preset terminal. When a focus preset switch (FP switch) $SW_2$ is on to change the FD terminal to the L level, the count of the counter 17 which indicates the current position of the lens distance ring which is a lens distance setting member is stored in the memory 32.

An RB terminal assumes the L level when an FP reproduction switch $SW_3$ is closed or turned on. When the FP reproduction switch $SW_3$ is turned on, the lens distance ring or the lens distance setting member is rotated to the position stored by the FP switch $SW_2$. By turning on the FP reproduction switch $SW_3$, the data of the FP counter memory 32 is transferred to the counter memory 31, and in response to the turn-on of the switch $SW_3$, the RB terminal is rendered to the L level, the motor 14 is rotated, the pulses generated by the encoder 15 are counted by the counter 7 and the motor 4 is rotated until the number of pulses stored in the counter memory 31 and the content of the counter 17 match. $R_2$ and $R_3$ denote pull-up resistors.

Figure 8:
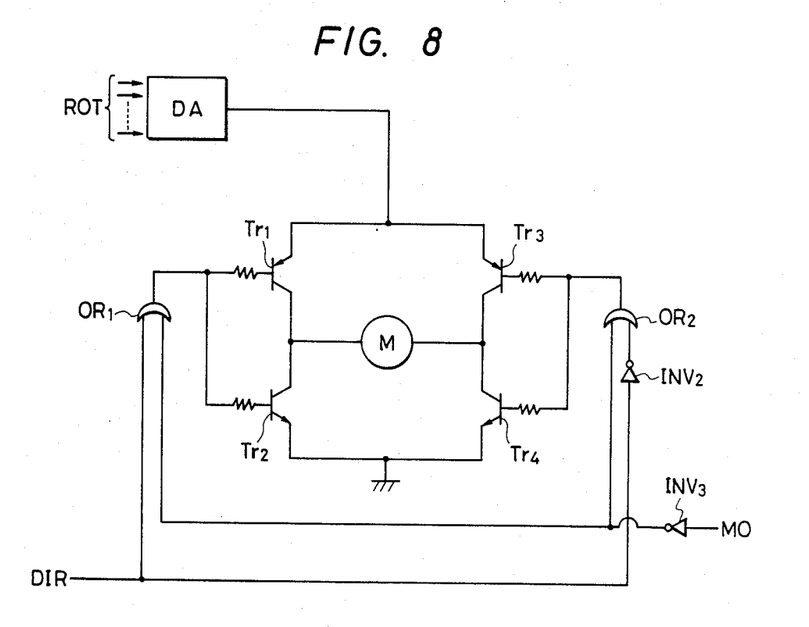
FIG. 8 shows a circuit diagram of a drive circuit 6 shown in FIG. 3.

FIG. 8 shows a circuit diagram of the circuit 6 of FIG. 3. DA denotes a D/A converter connected to an output terminal ROT of the microcomputer 13 to convert the output from the ROT terminal to a voltage, $Tr_1 \sim Tr_4$ denote transistors which form a bridge for a motor M, $OR_1$ and $OR_2$ denote OR gates, and $INV_2$ denotes an inverter. The inverter $INV_2$ and the OR gate $OR_1$ are connected to the terminal DIR of the microcomputer 3. $INV_3$ denotes an inverter which is connected to the output terminal MO of the microcomputer 3. When the terminal MO produces the H-level output, the outputs of the OR gates $OR_1$ and $OR_2$ are determined based on the signal from the terminal DIR and the motor is rotated forward or backward depending on the on/off states of the transistors $Tr_1 \sim Tr_4$. When the terminal MO produces the L-level output, the outputs of the OR gates $OR_1$ and $OR_2$ and H level, and the transistors $Tr_2$ and $Tr_4$ are turned on and the transistors $Tr_1$ and $Tr_3$ are turned off so that the motor is stopped. The voltage applied to the motor is controlled by the output of the DA converter DA and the speed of the motor is controlled by the applied voltage.

The operation of the embodiment of FIG. 3 is explained with reference to a flow chart of FIG. 4. The program is stored in a ROM of the microcomputer 13 which is operated by the stored program. The program is executed starting from a step 1 when the power supply of the microcomputer 13 is turned on. The power supply of the microcomputer 13 is turned on by the closing of the switch $SW_1$ through the microcomputer 11.

[Step 1] The motor 14 and other drivers are reset or stopped. The content of the counter 17 is reset to zero by the reset signal from the reset terminal of the microcomputer 13 on the lens, and the internal memory and flags in the microcomputer 13 on the lens are initialized.

[Step 2] The microcomputer 3 of the lens checks the presence or absence of the FP reproduction flag which indicates whether the FP operation is performed or not. If it is not the FP reproduction, the process proceeds to a step 3, and if it is the FP reproduction, the process proceeds to a step #10. Let us assume that it is not the FP reproduction.

[Step 3] Communication is made with the microcomputer 11 on the camera to check whether the drive of the lens is inhibited. If it is not inhibited, the process proceeds to a step 4, and if it is inhibited, the process proceeds to a step 8. The step 3 has a function to prevent the lens from being inadvertently driven when the camera is locked.

[Step 4] The on/off state of the FP reproduction switch $SW_3$ is checked. If the switch $SW_3$ is on by the FP operation, the process proceeds to a step 5 to start the FP operation, and if the switch $SW_3$ is off, the process proceeds to a step #6 to prepare for the FP operation.

[Step 5] The FP reproduction operation is started. The FP reproduction flag is set and the data in the FP counter memory 32 is transferred to the counter memory. The terminal MO produces the H level.

[Step 6] The FP switch $SW_2$ is checked. If the switch $SW_2$ is closwed, the process proceeds to a step 7, and if it is open, the process proceeds to a stop 8.

[Step 7] The content of the counter 7 which represents the position of the imaging lens distance ring (not shown) is read and stored into the FP counter memory 32 of the microcomputer 3 on the lens.

[Step 8] The microcomputer 11 on the camera is communicated with the microcomputer 13 on the lens, and the pulses representing the defocus distance and the rotation angle are supplied to the microcomputer 3. Whether a command to drive the motor 4 has been issued or not is checked. If it has been issued, the process proceeds to a step 9, and if its has not been issued, the process proceeds to a step 10.

[Step 9] The microcomputer 3 on the lens receives the current count of the counter 7 and stores in the counter memory 31 a sum of the rotation angle of the motor (the number of pulses representing the rotation angle) representing the defocus distance sent from the microcomputer 1 on the camera and the counter of the counter 7. The terminal MO produces the H-level signal to activate the motor drive circuit 6.

[Step 10] Whether a stop command has been issued or not by the communication with the microcomputer on the camera is checked. If the stop command has been issued, the process proceeds to a step 13, and if it has not been issued, the process proceeds to a step 11. This is used to stop the drive of the motor 4 when the shutter is actuated by the release.

[Step 11] Whether the motor 14 is being driven or not a checked. If it is, the process proceeds to a step 12, and if it is not, the process proceeds to a step 15. The check is done by determining whether the terminal MO of the microcomputer 13 produces the H-level signal or not.

[Step 12] The end of drive of the motor 14 is checked. The count of the counter 17 and the data in the counter memory 31 are compared, and if they are equal, it means the end of drive and the process proceeds to a step #13. If they are not equal, the process proceeds to a step #14.

[Step 13] The MO terminal of the microcomputer 13 on the lens produces the L-level output so that the motor drive circuit 6 stops the motor 4. The FP reproduction flag is reset.

[Step 14] The motor drive is controlled. The direction of drive of the motor 4 is determined depending on the polarity of the difference between the count of the counter 7 and the data in the counter memory 31, and it is supplied to the drive circuit 6 through the terminal DIR. The rotation speed of the motor 14 is specified by the terminal ROT by the absolute value of the difference between the count of the counter 17 and the data of the counter memory 31. When the difference is large, a high rotation speed is specified, and when the difference is small, a low rotation speed is specified so that the motor is smoothly stopped.

A detail will be explained with reference to a flow chart of FIG. 3.

[Step 15] Whether a command other than the motor drive command has been issued by the camera or not is checked. If it has been issued, the process proceeds to a step 16, and if not, the process returns to the step 2.

[Step 16] The command other than the motor drive command is processed.

As described above, since the process always starts from the step 2 of the loop, the priority order is FP reproduction, FP set, and drive from the camera.

The overall operation shown in the flow chart of FIG. 2 is summarized as follows.

The normal AF control operation is first explained. The switches SW2 and Sw3 are open, and if the lens drive command has not been issued by the camera after the power is turned on, the steps 2, 3, 4, 6, 8, 10, 11, 15, 2 or the steps 2, 3, -----, 11, 15, 16, 2 are repeated, and the lens is not driven at all.

Under this condition, the distance measurement device is in operation and the defocus distance is determined, and the number of pulses representing the rotation angle of the motor is determined based on the defocus distance. In the step 8, the data such as defocus distance is communicated, and if the absolute value of the defocus distance is larger than a predetermined value, the drive command is issued. In the step 9, the sum of the number of pulses and the current count of the counter 7 is stored into the memory 31 and the terminal MO produces the H-level output. The process proceeds to the steps 10 and 11, and since the motor is being driven, the process proceeds to the step 12 where the end of the drive of the lens is checked. If the drive of the lens by the above number of pulses has not yet been completed, the process goes to the step 2 through the step 14. Then, the steps 2, 3, 4, 6, 8, 10, 11, 12, 14, 2 are repeated.

On the other hand, the counter 17 counts the pulses from the encoder 15 as the lens is driven, and when the count reaches the count of the counter 31, an end of drive signal is produced. As the lens is driven by the number of pulses representing the defocus distance stored in the counter 31, it is detected in the step 12 and the motor 4 is stopped in the step 13. As a result, the lens is driven by the distance corresponding to the defocus distance into the in-focus state. After the lens has been stopped in the step 13, the process returns to the step 2 and the steps 2, 3, 4, 6, 8, 10, 11, 15, 2 or the steps 2, 3, 4, 6, 8, 10, 11, 15, 16, 2 are repeated. The defocus distance is again measured by the distance measurement device, and if a lens drive command is issued, the lens is driven by the defocus distance. The above steps are repeated so that the lens is always driven into the in-focus state.

The direction of counting (up-counting or down-counting) of the pulses from the encoder by the counter 17 is determined by the polarity of the difference calculated in the step 14, and the polarity of the defocus distance is determined whether it is near-focus or far-focus. In this manner, the lens is driven by the defocus distance into the in-focus state.

The FP operation is explained.

When the switch Sw2 is closed or turned on, the current count of the counter 17 is stored in the memory 32 in the step 7. The counter 17 contains the count which represents the current position of the lens. This count is stored in the memory 32. If the switch SW3 is closed during the normal AF control operation, it is detected in the step 4 and the process proceeds to the step 5. Thus, the FP reproduction flag is set, and the count of the counter 17 at the time of the closing of the switch SW2 stored in the memory 32, that is, the lens position information at the time of the closing of the switch SW2 is stored in the memory 31, and the terminal MO produces the H-level output to drive the motor. Then, the steps 10, 11, 12, 14 are carried out and the lens is driven until the count of the counter 17 reaches the data of the memory 31. When the data of the memory 31 and the count of the counter 17 match, the motor is stopped in the steps 12 and 13, and the FP reproduction flag is reset. As described above, the content of the memory 31 in the FP reproduction operation represents the count of the counter 17 at the time of the closing of the switch SW2. Thus, the lens is returned to the position at which it was at the time of the closing of the switch SW2. In the lens drive operation in the FP reproduction, the FP reproduction flag is set so that the step 3 to 9 are not executed.

Figure 5:
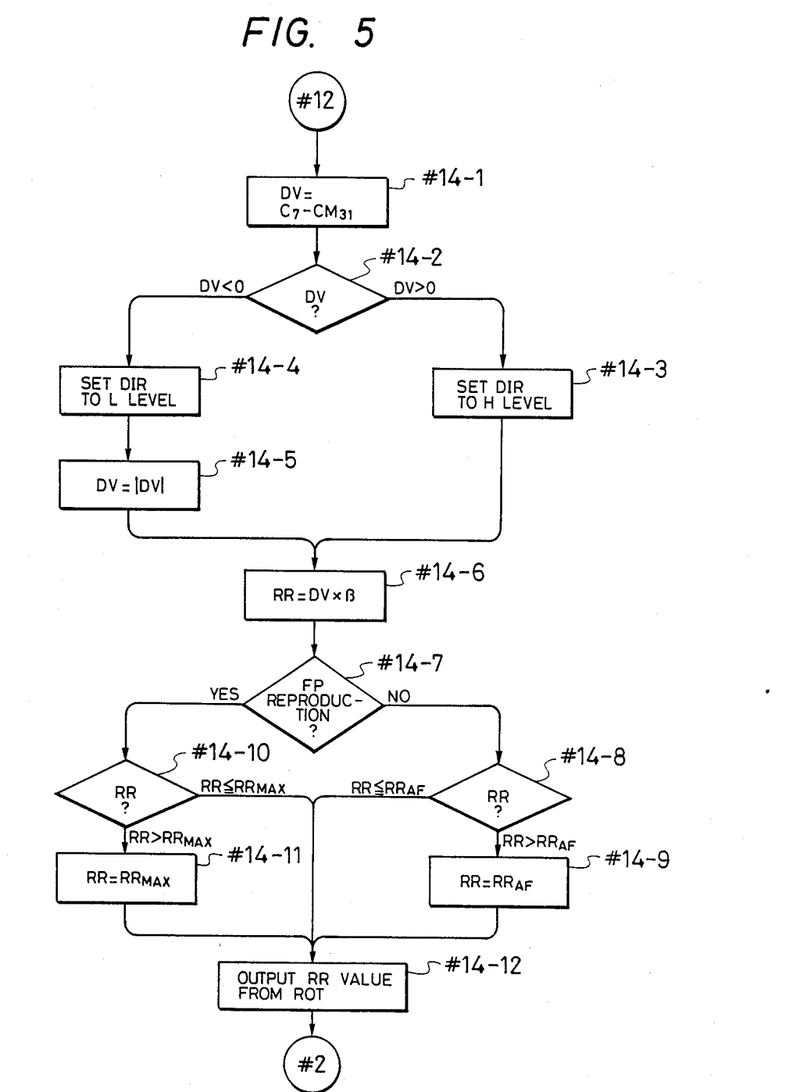

The motor drive control operation in the step 14 is explained in detail with reference to FIG. 5.

The step 14 comprises steps 14-1 to 14-12. In a step 14-1, a difference DV between the count $C_7$ of the counter 17 and the data $CM_{31}$ of the counter memory 31 is calculated.

[Step 14-2] The polarity of DV is checked. If it is positive, the process proceeds to a step 14-3, and if it is negative, the process proceeds to a step 14-4.

[Step 14-3] The terminal DIR is set to the H level to set the motor rotation direction to CL.

[Step 14-4] The terminal DIR is set to the L-level to set the motor rotation direction to CCL. The steps 14-2 to 14-4 determine the lens drive direction.

[Step 14-5] The absolute value of DV is determined.

[Step 14-6] The motor drive amount DV is multiplied by a coefficient $\beta$ to calculate a rotation speed RR of the motor.

[Step 14-7] Whether the FP reproduction flag is set or not is checked. If it is set, the process proceeds to a step 14-10, and if it is not set, the process proceeds to a step 14-8.

[Step 14-8] The calculated rotation speed RR of the motor is checked, and if RR is larger than the highest rotation speed $RR_{AF}$ of the motor for AF, the process proceeds to a step 14-9, and if it is smaller or equal, the process proceeds to a step 14-12.

[Step 14-9] The rotation speed RR of the motor is set to the highest rotation speed $RR_{AF}$ of the motor for AF.

[Step 14-10] The calculated rotation speed RR of the motor is checked. If RR is larger than a highest rotation speed $RR_{MAX}$ ($RR_{MAX} > RR_{AF}$), the process proceeds to a step 14-11, and if it is equal or smaller, the process proceeds to a step 14-12.

[Step 14-11] The rotation speed RR of the motor is set to the highest rotation speed $RR_{MAX}$.

[Step 14-12] The rotation speed RR of the motor is supplied to the terminal ROT to supply the rotation speed of the motor to the drive circuit 16.

Thus, the speed representing the information RR from the terminal ROT is set in the drive circuit 16 and the motor drive speed is controlled.

As described above, the larger the motor drive amount DV, the higher the rotation speed of the motor. In a vicinity of the stop position of the motor, the DV is small and hence the rotation speed of the motor is low so that the motor 4 can be smoothly stopped. In the AF drive operation, since the rotation speed of the motor is not set higher than $RR_{AF}$, the distance measuring device 12 may be operated while the motor is driven, and during the FP reproduction, the rotation speed of the motor may be set up to the highest rotation speed. Accordingly, high speed FP reproduction operation is attained without being affected by the performance of the AF system.

Figure 6:
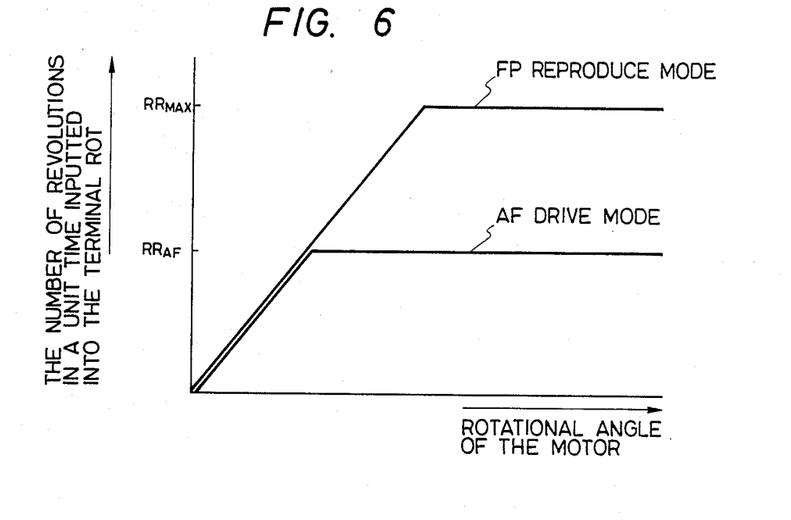
FIG. 6 shows waveforms for explaining the operation of the embodiment of FIG. 3.

FIG. 6 shows a graph of the number of revolutions in a unit time inputted into the terminal ROT versus the rotation angle of the motor 4 in the motor drive control operation. When the rotation speed of the motor is constant, a higher speed can be set in the FP reproduction mode than in the AF drive mode so that the lens can be very rapidly restored to a desired position.

In the step 14-1, the lens drive distance is determined, and in the steps 14-2 to 14-5, the drive direction is determined. In the normal AF mode, the speed is controlled with the speed limit of $RR_{MAX}$, and the speed is gradually decreased as the lens approaches the target position. In the FP mode, a similar speed control is effected, but since the speed limit is set higher than that of the normal AF mode, the lens is driven to the target position at a high speed.

Figure 7:
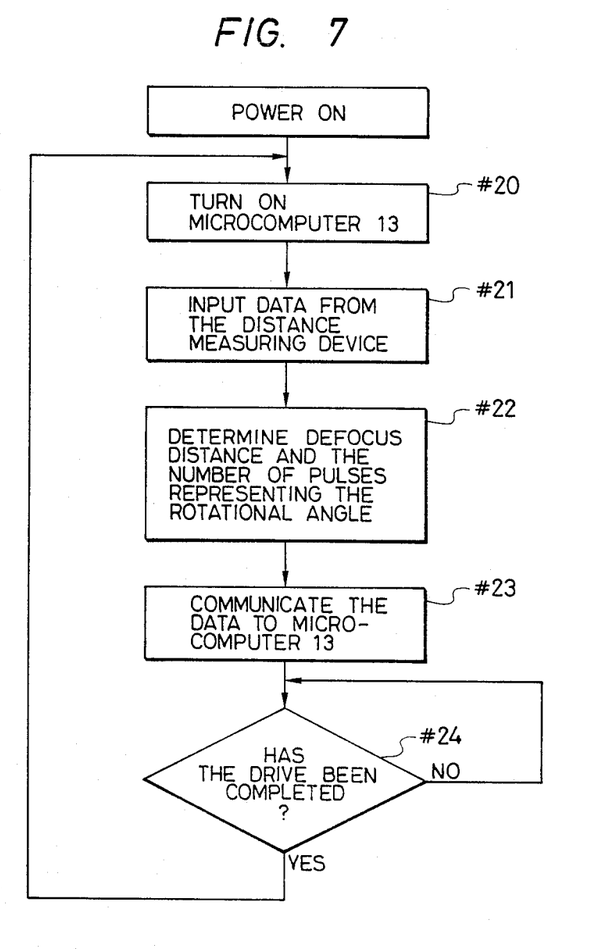

FIG. 7 shows a flow chart of the program of the microcomputer 11 on the camera shown in FIG. 3. It shows only a program which relates to the AF operation. The operation on the camera such as AF operation is explained in accordance with the program. When the switch $SW_1$ is turned on, a step 20 is started and the power supply of the microcomputer 3 on the lens is turned on. In a step 21, the data is received from the distance measurement device 2, and in a step 22, the defocus distance and the number of pulses representing the rotation angle are determined based on the above data. In a step 23, the data determined in the step 22 is communicated to the microcomputer 3. In a step 24, whether the drive in the step 12 of FIG. 4 has been completed or not is checked by the communication with the lens, and if it has been completed, the process goes to the step 20. Since the microcomputer 1 on the camera operates in this manner, the operation is controlled in cooperation with the microcomputer 3 on the lens.

In the above embodiment, the AF system of FIGS. 1 and 2 and the AF system of FIG. 3 are not explained because they have been known. Such AF system may be those described in U.S. application Ser. Nos. 829,792 and 688,355.

As described above, in accordance with the present invention, the set position can be restored by the motor in a very short time, and a plurality of set positions can be stored and read by simple manipulation of the swtich. Thus, a failure of valuable shutter chance is prevented and the vibration of picture image due to manual drive of the distance ring is prevented.

What we claim is:

1. An auto-focus camera system for driving a lens of a lens barrel to an in-focus position on the basis of a signal from a focus adjusting circuit, comprising:
   (a) setting means for setting arbitrary position information;
   (b) a driving circuit operating in a first mode for driving the lens to the in-focus position on the basis of a signal from the focus adjusting circuit, and operating in a second mode for driving the lens to a position in accordance with the position information set by said setting means;
   (c) selecting means for manually selecting the modes of said driving circuit; and
   (d) speed control means for controlling the driving speed of the lens so that the driving speed of the lens in said second mode is greater than in said first mode.

2. A camera system according to claim 1, wherein said speed control means comprises a speed control circuit comprising a voltage control circuit which restricts the peak voltage level applied to said driving circuit in the first mode so that the peak voltage level applied to said driving circuit in said first mode is lower than the peak voltage level in said second mode.

3. A camera system according to claim 1, wherein a signal from said focus adjusting circuit has a value corresponding to the defocus distance, and wherein said camera system further comprises:
   monitor means for monitoring the actual lens position; and
   a calculation circuit for calculating the difference between the position information set by said setting means and the actual lens position monitored by said monitor means;
   wherein said speed control means selects a speed corresponding to said defocus distance from a first driving speed range in said first mode and selects a speed corresponding to the difference calculated by said calculation circuit from a second driving speed range having a maximum speed greater than the maximum speed of said first driving speed range.

4. An auto-focus camera system for driving a lens of a lens barrel to an in-focus position on the basis of a signal from a focus adjusting circuit, comprising:
   (a) setting means for setting arbitrary position information;
   (b) a driving circuit operating in a first mode for driving the lens to the in-focus position on the basis of a signal from the focus adjusting circuit, and operating in a second mode for driving the lens to a position in accordance with the position information set by said setting means;
   (c) selecting means for manually selecting the modes of said driving circuit;
   (d) discriminating means for discriminating whether the driving of the lens to a position corresponding to the set position information by said driving circuit in said second mode is completed; and
   (e) prohibiting means for prohibiting the driving circuit from making the transition from said second mode to said first mode until the completion of said lens driving is discriminated by said discriminating means in said second mode.

5. A camera system according to Claim 4, wherein said selecting means comprises:
   a manual operation switch for selecting said first and second modes; and
   communication means for performing a first communication process for transmitting the signal from said focus adjusting circuit to said driving circuit when said first mode is selected by said manual operation switch and for performing a second communication process for transmitting a signal corresponding to the position information set by said setting means to said driving circuit when said second mode is selected by said manual operation switch;
   wherein said prohibiting means maintains the performance of said second communication process until the completion of lens driving is discriminated by said discriminating means and maintains the performance of said second communication process up to the completion of lens driving if said manual operation switch is switched to select said first mode during the lens driving operation in said second mode.

6. A camera system according to claim 5, wherein said prohibiting means comprises detection means for detecting that the completion of lens driving is discriminated by said discriminating means and for detecting that said manual operation switch is in a state for selecting said first mode, and means for changing the process performed by said communication means from said second communication process to said first communication process.

7. An auto-focus camera system for driving a lens of a lens barrel to an in-focus position on the basis of a signal from a focus adjusting circuit, comprising:
   (a) setting means for setting arbitrary position information;
   (b) a driving circuit operating in a first mode for driving the lens to the in-focus position on the basis of a signal from the focus adjusting circuit, and operating in a second mode for driving the lens to a position in accordance with the position information set by said setting means;
   (c) selecting means for manually selecting the modes of said driving circuit;
   (d) discriminating means for discriminating whether the driving of the lens to a position corresponding to the set position information by said driving circuit in said second mode is completed; and
   (e) holding means for prohibiting said driving circuit from responding to the selecting of said first mode by said selecting means and for maintaining said driving means in said second mode until the lens driving in said second mode is completed.

8. An auto-focus camera system for driving a lens of a lens barrel to an in-focus position on the basis of a signal from a focus adjusting circuit, comprising:
   (a) monitor means for monitoring the actual lens position by following the movement of the lens;
   (b) an operation member;
   (c) memory means for memorizing a signal corresponding to the lens position monitored by said monitor means when said operation member is operated;
   (d) a driving circuit operating in a first mode for driving the lens to the in-focus position on the basis of a signal from the focus adjusting circuit and operating in a second mode for driving the lens to a position corresponding to the signal memorized in said memory means; and
   (e) selecting means for manually selecting the modes of said driving circuit.

9. A camera system according to claim 8, wherein said monitor means comprises:
   a pulse generating means for generating a number of pulses corresponding to the distance the lens is driven; and
   a counter for counting the pulses generated by said pulse generating means;
   wherein said memory means memorizes the value counted by said counter at the time when said operation member is operated, and
   wherein said driving circuit drives the lens by a distance corresponding to the difference between the value counted by said counter and the value memorized in said memory means.

10. A lens barrel mountable on a camera having a focus adjusting circuit for outputting a signal representing the focusing state of a lens with respect to an object, comprising:
    (a) setting means for setting arbitrary position information;
    (b) a driving circuit operating in a first mode for driving the lens to the in-focus position on the basis of a signal from the focus adjusting circuit, and operating in a second mode for driving the lens to a position in accordance with the position information set by said setting means;
    (c) selecting means for manually selecting the second mode of said driving circuit; and
    (d) speed control means for controlling the driving speed of the lens so that the driving speed of the lens in said second mode is greater than in said first mode.

11. A lens barrel according to claim 10, wherein said speed control means comprises a speed control circuit comprising a voltage control circuit which restricts the peak voltage level applied to said driving circuit in the first mode so that the peak voltage level applied to said driving circuit in said first mode is lower than the peak voltage level in said second mode.

12. A lens barrel mountable on a camera having a focus adjusting circuit for outputting a signal representing the focusing state of a lens with respect to an object, comprising:
(a) setting means for setting arbitrary position information;
(b) a driving circuit operating in a first mode for driving the lens tothe in-focus position on the basis of a signal from the focus adjusting circuit, and operating in a second mode for driving the lens to a position in accordance with the position information set by said setting means;
(c) selecting means for manually selecting the modes of said driving circuit;
(d) discriminating means for discriminating whether the driving of the lens to a position corresponding to the set position information by said driving circuit in said second mode is completed; and
(e) holding means for prohibiting said driving circuit from responding to the selecting of said first mode by said selecting means and for maintaining said driving means in said second mode until the lens driving in said second mode is completed.

13. A lens barrel mountable on a camera having a focus adjusting circuit for outputting a signal representing the focusing state of a lens with respect to an object, comprising:
(a) monitor means for monitoring the actual lens position by following the movement of the lens;
(b) an operation member;
(c) memory means for memorizing a signal corresponding to the lens position monitored by said monitor means when said operation member is operated;
(d) a driving circuit operating in a first mode for driving the lens to the in-focus position on the basis of a signal from the focus adjusting circuit and operating in a second mode for driving the lens to a position corresponding to the signal memorized in said memory means; and
(e) selecting means for manually selecting the modes of said driving circuit.

* * * * *

UNITED STATES PATENT AND TRADEMARK OFFICE
CERTIFICATE OF CORRECTION

PATENT NO. : 4,783,676
DATED : November 8, 1988
INVENTOR(S) : YOSHIHIKO AIHARA ET AL.

It is certified that error appears in the above-identified patent and that said Letters Patent is hereby corrected as shown below:

IN THE DRAWINGS,
SHEET 4 OF 7

Figure 4:
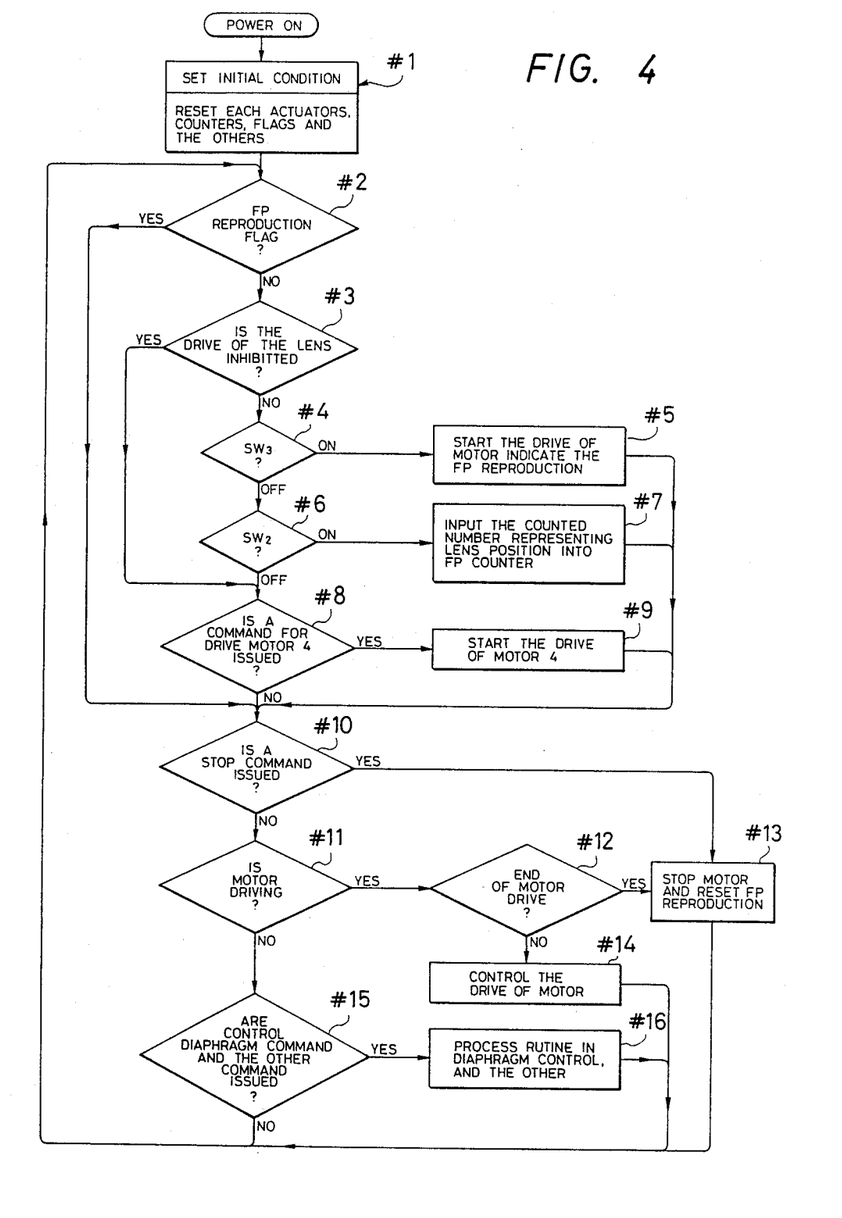
FIGS. 4, 5 and 7 show program flow diagrams for explaining the operation of the embodiment of FIG. 3.

Fig. 4, #3, "INHIBITTED" should read --INHIBITED--.
    Fig. 4, #16, "RUTINE" should read --ROUTINE--.

COLUMN 1

Line 11, "with to" should read --with respect to--.
    Line 14, "autop-focus" should read --auto-focus--.

COLUMN 2

Line 37, "detetion" should read --detection--.
    Line 49, "denote" should read --denotes--.
    Line 63, "selected" should read --selection--.

COLUMN 3

Line 20, "to" (first occurrence) should read --or--.
    Line 29, "other" should read --another--.
    Line 64, "distanct" should read --distance--.

COLUMN 4

Line 7, "responce" should read --response--.
    Line 24, """" should read --"1"--.
    Line 31, "inventer" should read --inverter--.
    Line 39, "postion" should read --position--.
    Line 43, "denores" should read --denotes--.
    Line 61, "motor 4" should read --motor 14--.
    Line 65, "kown" should read --known--.

UNITED STATES PATENT AND TRADEMARK OFFICE
CERTIFICATE OF CORRECTION

PATENT NO. : 4,783,676

DATED : November 8, 1988

INVENTOR(S) : YOSHIHIKO AIHARA ET AL.

It is certified that error appears in the above-identified patent and that said Letters Patent is hereby corrected as shown below:

COLUMN 5

Line 2, "relfection" should read --reflection--.
Line 3, "motor 4" should read --motor 14--.
Line 4, "motor 4" should read --motor 14--.
Lines 9-10, "microcompuer 11" should read --microcomputer 11--.
Line 18, "drive circuit 6" should read --drive circuit 16--.
Line 32, "MQ terminal" should read --MO terminal--.
Line 38, "motor 4" should read --motor 14--.
Line 56, "counter 7" should read --counter 17-- and "motor 4" should read --motor 14--.
Lines 67-68, "microcomputer 3." should read --microcomputer 13.--.

COLUMN 6

Line 2, "3." should read --13.--.
Line 8, "and" (second occurrence) should read --are--.
Line 29, "microcomputer 3" should read --microcomputer 13--.
Line 55, "closwed," should read --closed,--.
Line 56, "stop 8." should read --step 8.--.
Line 57, "counter 7" should read --counter 17--.
Line 64, "microcomputer 3." should read --microcomputer 13.--.
Line 65, "motor 4" should read --motor 14--.
Line 67, "its" should read --it--.

UNITED STATES PATENT AND TRADEMARK OFFICE
CERTIFICATE OF CORRECTION

PATENT NO. : 4,783,676

DATED : November 8, 1988

INVENTOR(S) : YOSHIHIKO AIHARA ET AL.

It is certified that error appears in the above-identified patent and that said Letters Patent is hereby corrected as shown below:

COLUMN 7

Line 1, "microcomputer 3" should read --microcomputer 13--.
    Line 2, "counter 7" should read --counter 17--.
    Line 6, "microcomputer 1" should read --microcomputer 11-- and "counter" should read --count--.
    Line 7, "counter 7." should read --counter 17.--.
    Line 14, "motor 4" should read --motor 14--.
    Line 17, "a" (first occurrence) should read --is--.
    Line 32, "motor 4" should read --motor 14--.
    Line 34, "counter 7" should read --counter 17--.
    Line 55, "FIG. 2" should read --FIG. 4--.

COLUMN 8

Line 3, "counter 7" should read --counter 17--.
    Line 18, "motor 4" should read --motor 14--.
    Line 37, "switch Sw$_2$" should read --switch SW$_2$--.
    Line 61, "step" should read --steps--.

COLUMN 9

Line 41, "motor 4" should read --motor 14--.
    Line 52, "motor 4" should read --motor 14--.

UNITED STATES PATENT AND TRADEMARK OFFICE
CERTIFICATE OF CORRECTION

PATENT NO. : 4,783,676
DATED : November 8, 1988
INVENTOR(S) : YOSHIHIKO AIHARA ET AL.

It is certified that error appears in the above-identified patent and that said Letters Patent is hereby corrected as shown below:

COLUMN 10

Line 4, "microcomputer 3" should read --microcomputer 13--.
Line 10, "microcomputer 3." should read --microcomputer 13.--.
Line 14, "microcomputer 1" should read --microcomputer 11--.
Line 16, "microcomputer 3" should read --microcomputer 13--.
Line 27, "swtich." should read --switch.--.

COLUMN 13

Line 10, "tothe" should read --to the--.

Signed and Sealed this

Third Day of March, 1992

Attest:

HARRY F. MANBECK, JR.

*Attesting Officer*     *Commissioner of Patents and Trademarks*